United States Patent
Heo et al.

(10) Patent No.: US 9,436,049 B2
(45) Date of Patent: Sep. 6, 2016

(54) FLAT DISPLAY PANEL HAVING NARROW BEZEL

(71) Applicant: LG Display Co., Ltd., Seoul (KR)

(72) Inventors: Seungho Heo, Paju-si (KR); Byeongseong So, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/082,022

(22) Filed: Nov. 15, 2013

(65) Prior Publication Data

US 2014/0152935 A1 Jun. 5, 2014

(30) Foreign Application Priority Data

Nov. 30, 2012 (KR) ........................ 10-2012-0138011

(51) Int. Cl.
*G02F 1/1362* (2006.01)
*G02F 1/1345* (2006.01)
*G02F 1/1339* (2006.01)
*G02F 1/1343* (2006.01)

(52) U.S. Cl.
CPC ......... *G02F 1/13454* (2013.01); *G02F 1/1339* (2013.01); *G02F 2001/134372* (2013.01); *G02F 2201/121* (2013.01); *G02F 2202/16* (2013.01)

(58) Field of Classification Search
CPC .................. G02F 1/1339; G02F 1/136286
USPC ............................................. 349/40, 138, 139
See application file for complete search history.

(56) References Cited

U.S. PATENT DOCUMENTS

| 6,014,193 A * | 1/2000 | Taira ................... G02F 1/13336 345/90 |
| 2003/0117571 A1* | 6/2003 | Ko ........................ G02F 1/1339 349/153 |
| 2005/0023956 A1* | 2/2005 | Kwak ................. H01L 27/3276 313/495 |
| 2006/0215102 A1* | 9/2006 | Otose et al. ................... 349/151 |
| 2007/0225096 A1* | 9/2007 | Fujita ................ G02F 1/134363 474/202 |
| 2007/0279543 A1* | 12/2007 | Park .................. G02F 1/136204 349/40 |
| 2008/0204619 A1* | 8/2008 | Saitou ............... G02F 1/136204 349/43 |
| 2010/0134745 A1* | 6/2010 | Lee et al. ....................... 349/153 |
| 2011/0090445 A1* | 4/2011 | Kim ...................... G02F 1/1339 349/139 |
| 2011/0116019 A1* | 5/2011 | Hwang et al. .................. 349/84 |
| 2011/0194062 A1* | 8/2011 | Lee ................................ 349/149 |
| 2011/0227816 A1* | 9/2011 | Nakamura ........ G02F 1/133707 345/92 |
| 2012/0147309 A1* | 6/2012 | Sato ...................... G02F 1/1341 349/138 |

FOREIGN PATENT DOCUMENTS

| KR | 2008-0051250 | * | 6/2008 | ........... G02F 1/1339 |
| KR | 2008-0055192 | * | 6/2008 | ........... G02F 1/1345 |

* cited by examiner

*Primary Examiner* — Sang V Nguyen
(74) *Attorney, Agent, or Firm* — Fenwick & West LLP

(57) ABSTRACT

The present disclosure relates to reducing bezel area of a flat display panel comprising a substrate with a non-display area surrounding a display area, the display area comprising common lines coupled to corresponding rows of pixels; and a gate driver formed in the non-display area. The display may further include a conductive sealing region formed in the non-display area and configured to supply a common line voltage; and a plurality of common pads formed within the conductive sealing region and each coupled to a corresponding one of the common lines to apply a common line voltage to the rows of pixels. Alternatively, the display may further include a vertical common line formed in the non-display area between the gate driver and the display area, the vertical common line extending from top to bottom of the non-display area and coupled to said common lines to apply a common voltage.

20 Claims, 6 Drawing Sheets

FLAT DISPLAY PANEL HAVING NARROW BEZEL

CROSS-REFERENCE TO RELATED APPLICATION

This application claims priority to Republic of Korea Patent Application No. 10-2012-0138011 filed on Nov. 30, 2012, which is incorporated by reference herein in its entirety.

BACKGROUND OF THE INVENTION

1. Field of the Invention

The present disclosure relates to a flat panel display in which the display area is maximized by reducing the width of the bezel area. Especially, the present disclosure relates to a large area flat panel display in which the display area is maximized by replacing a conductive sealing material with the common line for reducing the width of the bezel area.

2. Discussion of the Related Art

Various flat panel displays (or 'FPD') are developed for overcoming the many drawbacks of the cathode ray tube (or 'CRT') such as heavy weight and bulk volume. The flat panel display devices include the liquid crystal display device (or 'LCD'), the field emission display (or 'FED'), the plasma display panel (or 'PDP'), the organic light emitting display device (or 'OLED') and the electrophoresis display device (or 'ED').

The flat panel display can represent the video information by using a gate driving circuit for supplying a scan signal to gate lines and a data driving circuit for supplying a data voltage to data lines. For example, the gate driving circuit may be formed by a TAB (Tape Automated Bonding) method in which a printed circuit board embedded with a plurality of gate drive IC (Integrated Circuit) is attached to the display panel.

FIG. 1 is a plane view illustrating the structure of the flat panel display formed by the TAB method. Referring to FIG. 1, the data driver DIC, for connecting to the data line, is disposed at one portion of the upper side of the display panel DPL by a TAB method. That is, the data driver DIC is mounted on the tape carrier package (or 'TCP'), the one side of the TCP TP is connected to the pad part disposed to one portion of the upper side of the display panel DPL. A number of data drivers DIC may be attached using the TAB method to drive all the data lines of the display panel DPL. Similarly, on the left side of the display panel DPL, a number of gate drivers GIC are disposed on respective TCP TP for connecting to the gate lines of the display panel DPL by TAB method. The controller TCON disposed on the printed circuit board TCP is configured to control the data driver DIC and the gate driver GIC, and the power PIC disposed on the printed circuitboard PCB is configured to supply the electric power necessary to drive the data lines and data lines and power the controller TCON and the ICs. A pad of the printed circuit board PCB may be connected to the TCP TPs having the data drivers DICs.

The display panel DP of a flat panel display may include a thin film transistor substrate having a thin film transistor allocated in a number of pixel areas arranged in a matrix manner. For example, the liquid crystal display device represents video data by controlling the light transitivity of the liquid crystal layer using the electric fields. According to the direction of the electric field, the LCD can be classified as one of two major types; vertical electric field type and horizontal electric field type.

For the vertical electric field type LCD, a common electrode formed on an upper substrate and a pixel electrode formed on a lower substrate are facing with each other for forming an electric field of which direction is perpendicular to the substrate face. A twisted nematic (TN) liquid crystal layer disposed between the upper substrate and the lower substrate is driven by the vertical electric field. The vertical electric field type LCD has merit of higher aperture ratio, while it has demerit of narrower view angle about 90 degree.

For the horizontal electric field type LCD, a common electrode and a pixel electrode are formed on the same substrate in parallel. A liquid crystal layer disposed between an upper substrate and a lower substrate is driven in In-Plane-Switching (or 'IPS') mode by an electric field parallel to the substrate face. The horizontal electric field type LCD has a merit of wider view angle over 160 degrees and faster response speed than the vertical electric field type LCD. However, the horizontal electric field type LCD may have demerits such as low aperture ratio and transitivity ratio of the back light.

In the IPS mode LCD, for example, in order to form the in-plane electric field, the gap between the common electrode and the pixel electrode may be larger than the gap between the upper substrate and the lower substrate, and in order to get enough strength of the electric field, the common electrode and the pixel electrode may have a strip pattern having a certain width. Between the pixel electrode and the common electrode of the IPS mode LCD, the electric field horizontal with the substrate is formed. However, just over the pixel electrode and the common electrode, there is no electric field. That is, the liquid crystal molecules disposed just over the pixel electrodes and the common electrodes are not driven but maintain the initial conditions (the initial alignment direction). As the liquid crystal molecules in the initial condition cannot control the light transitivity properly, the aperture ratio and the luminescence may be degraded.

For resolving these demerits of the IPS mode LCD, the fringe field switching (or 'FFS') type LCD driven by a fringe electric field has been proposed. The FFS type LCD comprises the common electrode and the pixel electrode with the insulating layer there-between, and the gap between the pixel electrode and the common electrode is set narrower than the gap between the upper substrate and the lower substrate. Consequently, a fringe electric field having a parabola shape is formed in the space between the common electrode and the pixel electrode as well over these electrodes. Therefore, most of all liquid crystal molecules disposed between the upper substrate and the lower substrate can be driven by this fringe field. As a result, it is possible to enhance the aperture ratio and the front luminescence.

FIG. 2 is a plane view illustrating a thin film transistor substrate having an oxide semiconductor layer included in a fringe field type liquid crystal display according to the related art. FIG. 3 is a cross-sectional view illustrating the structure of the thin film transistor substrate of FIG. 2 by cutting along the line I-I' according to the related art.

The thin film transistor substrate shown in FIGS. 2 and 3 comprises a gate line GL and a data line DL crossing each other with a gate insulating layer GI therebetween on a lower substrate SUB, and a thin film transistor T formed at each crossing portion. By the crossing structure of the gate line GL and the data line DL, a pixel area is defined. In the pixel area, a pixel electrode PXL and a common electrode COM facing each other with a passivation layer PAS therebetween are disposed for forming the fringe field. For example, the pixel electrode PXL has a rectangular shape corresponding to the shape of the pixel area, and the common electrode COM has a plurality of strips disposed in parallel with each other.

The common electrode COM is connected to a common line CL disposed in parallel with the gate line GL. A reference voltage (or 'common voltage') is supplied to the common electrode COM through the common line CL.

The thin film transistor T charges and maintains the pixel signal voltage to the pixel electrode PXL by responding to the gate signal of the gate line GL. To do so, the thin film transistor T comprises a gate electrode G branched from the gate line GL, a source electrode S branched from the data line DL, a drain electrode D facing the source electrode S and connecting to the pixel electrode PXL, and a semiconductor layer A overlapping with the gate electrode G having the gate insulating layer GI therebetween for forming a channel between the source electrode S and the drain electrode D. Between the semiconductor layer A and the source electrode S, and between the semiconductor layer A and the drain electrode D, the ohmic contact layers may be further included for making the ohmic contact therebetween.

Especially, for the case that the semiconductor layer A includes oxide semiconductor material, as it has high electron mobility characteristics, it is proper to apply to the large area thin film transistor substrate requiring the large charging capacity. However, the thin film transistor having the oxide semiconductor material may further include etch stopper ES for protecting the upper surface of the oxide semiconductor layer from the etching material for ensuring the stability of the semiconductor material. In detail, when dividing the source electrode S and the drain electrode D by an etching method, the oxide semiconductor material may be damaged by an etchant intruded into the oxide semiconductor material from this etched portion. To protect the oxide semiconductor material, the etch stopper ES would be formed.

At the one end portion of the gate line GL, the gate pad GP may be included for receiving the gate signal from the external device. The gate pad GP may be contacted to the gate pad terminal GPT through the gate pad contact hole GPH penetrating the gate insulating layer GI and the passivation layer PAS. Further, at the one end portion of the gate line DL, the data pad DP may be included for receiving the pixel signal from the external device. The data pad DP may be contacted to the data pad terminal DPT through the data pad contact hole DPH penetrating the passivation layer PAS.

Referring to FIGS. 1 and 2, at the left one side of the display panel DPL, the TAB having the gate driver GIC is attached to the gate pad terminal GPT so that the gate driver GIC can supply the scan signals to the gate lines GL. At the upper one side of the display panel DPL, the TAB having the date driver DIC is attached to the data pad terminal DPT so that the data driver DIC can supply the video data signal to the data lines DL.

The pixel electrode PXL formed on the gate insulating layer GI is contacted to the drain electrode D. On the other hand, the common electrode COM is formed to overlap with the pixel electrode PXL on the passivation layer PAS covering the pixel electrode PXL. Between the pixel electrode PXL and the common electrode COM, the fringe electric field is formed. By this fringe electric field, the liquid crystal molecules arrayed in plane direction between the thin film transistor substrate and the color filter substrate may be rotated according to the dielectric anisotropy of the liquid crystal molecules. According to the rotation degree of the liquid crystal molecules, the light transmittance ratio of the pixel area may be changed so as to represent desired gray scale.

For the flat panel display having the display panel DP and controller TCON and drivers DIC, GIC for driving the display panel, the ratio of the display area for representing the video information to the physical display device surface area (e.g., including a surrounding bezel) may be increased more and more. That is, by increasing the display area in the same area of the display panel, a larger display can be gotten with same size of the physical display device. To do so, for one example, by reducing the area for mounting the driver and controller, the ratio of the display area to the physical display device surface area can be maximized.

SUMMARY OF THE INVENTION

In order to overcome the above mentioned drawbacks, the purpose of the present disclosure is to suggest a display panel for flat panel display having a narrow bezel structure. Another purpose of the present disclosure is to suggest a display panel for flat panel display having a narrow bezel by minimizing the area for disposing the common line which is formed at the side portions of the display panel.

In order to accomplish the above purpose, one embodiment of the present disclosure suggests a flat display panel according to one embodiment comprising a substrate including a display area and a non-display area surrounding the display area, the display area comprising a plurality of common lines each coupled to a corresponding one of a plurality of rows of pixels; a gate driver formed in the non-display area; a conductive sealing region formed in the non-display area and configured to supply a common line voltage; and a plurality of common pads formed within the conductive sealing region and each coupled to a corresponding one of the common lines to apply a common line voltage to the corresponding one of the rows of pixels.

In some embodiments, the display area comprises a plurality of gate lines each coupled to the corresponding one of the rows of pixels, and the gate driver formed in the non-display area between the display area and the conductive sealing region is configured to apply gate signals to the gate lines.

In some embodiments, the gate lines are substantially parallel to the common lines within the display area.

In some embodiments, the common pads and conductive sealing material disposed in the conductive sealing region directly contact each other to make an electric connection.

In some embodiments, the common pads are electrically connected to common pad terminals via contact holes formed in an insulating layer disposed to cover the common pads.

In some embodiments, a conductive sealing material disposed in the conductive sealing region electrically contacting the common pads receives the common line voltage from a data driver disposed on an upper edge of the display panel.

In some embodiments, a minimum width of a bezel of the flat display panel corresponds to a minimum width of space for the gate driver and a minimum width of space for the conductive sealing region formed within the non-display area.

Another embodiment of the present disclosure suggests a flat display panel comprising a substrate including a display area and a non-display area surrounding the display area, the display area comprising a plurality of common lines each coupled to a corresponding one of a plurality of horizontal rows of pixels; a gate driver formed in the non-display area; a vertical common line formed in the non-display area between the gate driver and the display area, the vertical common line extending from a top of the non-display area to a bottom of the non-display and coupled to the common lines to apply a common voltage.

In some embodiments, the gate driver formed in the non-display area is configured to apply gate signals to a plurality of gate lines extending through a region of the vertical common line to the display area, the gate lines each coupled to the corresponding one of the rows of pixels.

In some embodiments, the gate lines are substantially parallel to the common lines.

In some embodiments, a sealing material formed in the non-display area surrounds the gate driver and the plurality of pixels.

In some embodiments, a minimum width of a bezel of the flat display panel corresponds to a minimum width of space for the gate driver, a minimum width of space for the vertical common line, and a minimum width of space for the sealing material formed within the non-display area.

The present disclosure may also suggest a flat display panel having narrow bezel by forming the gate driving circuit directly on the substrate of the display panel. Further, in the present disclosure, by commonly disposing the seal area with the common line disposed at the side portions of the display panel, the narrow bezel structure can be acquired. In detail, using a conductive sealing material for connecting a plurality of the common lines each other, the bezel area can be minimized

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Figure 1:
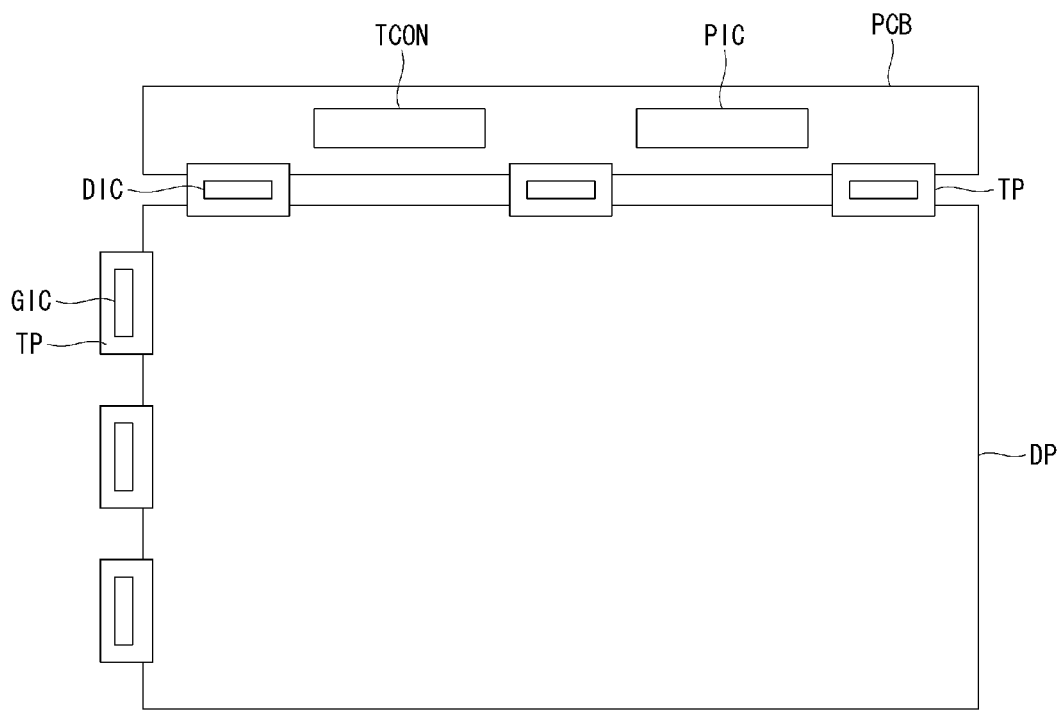
FIG. 1 is a plane view illustrating a structure of the flat panel display formed by the TAB method in the related art.
Figure 2:
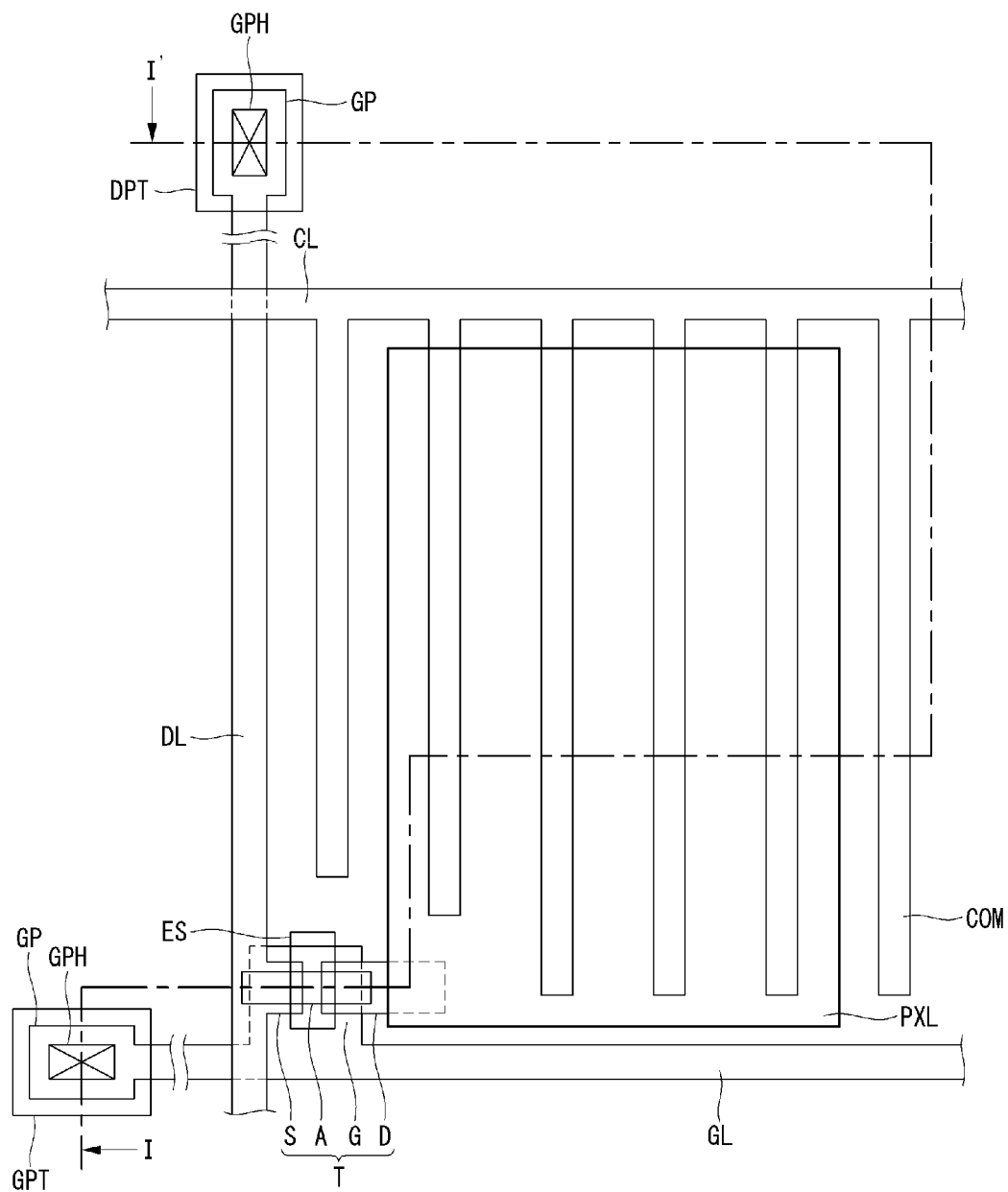
FIG. 2 is a plane view illustrating a thin film transistor substrate having an oxide semiconductor layer included in a fringe field type liquid crystal display according to the related art.
Figure 3:
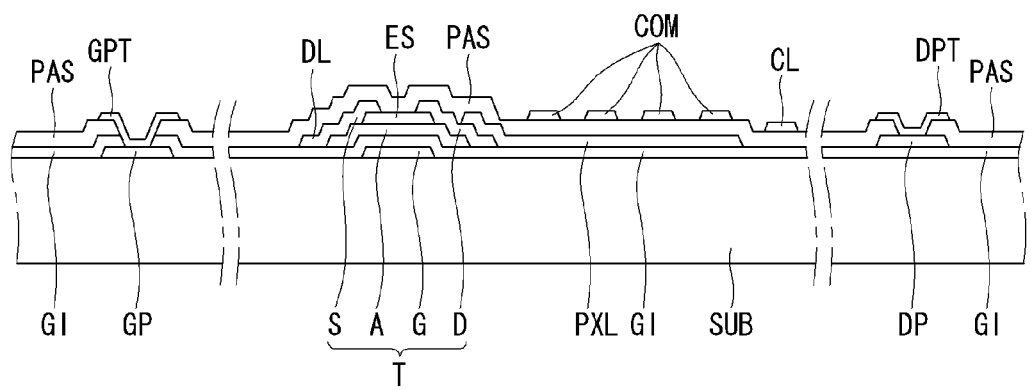
FIG. 3 is a cross-sectional view illustrating the structure of the thin film transistor substrate of FIG. 2 by cutting along the line I-I' according to the related art.

DETAILED DESCRIPTION OF THE
ILLUSTRATED EMBODIMENTS

Referring to attached figures, preferred embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

Figure 4:
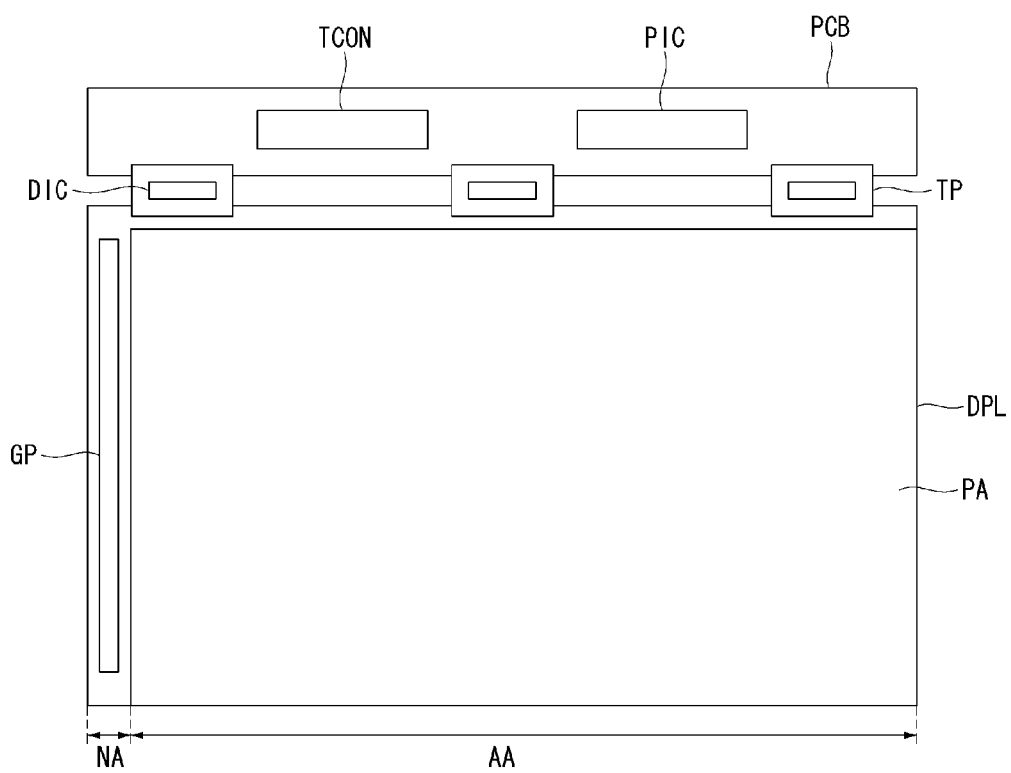
FIG. 4 is a plane view illustrating the structure of a flat panel display formed by GIP method according to the present disclosure.
Figure 5:
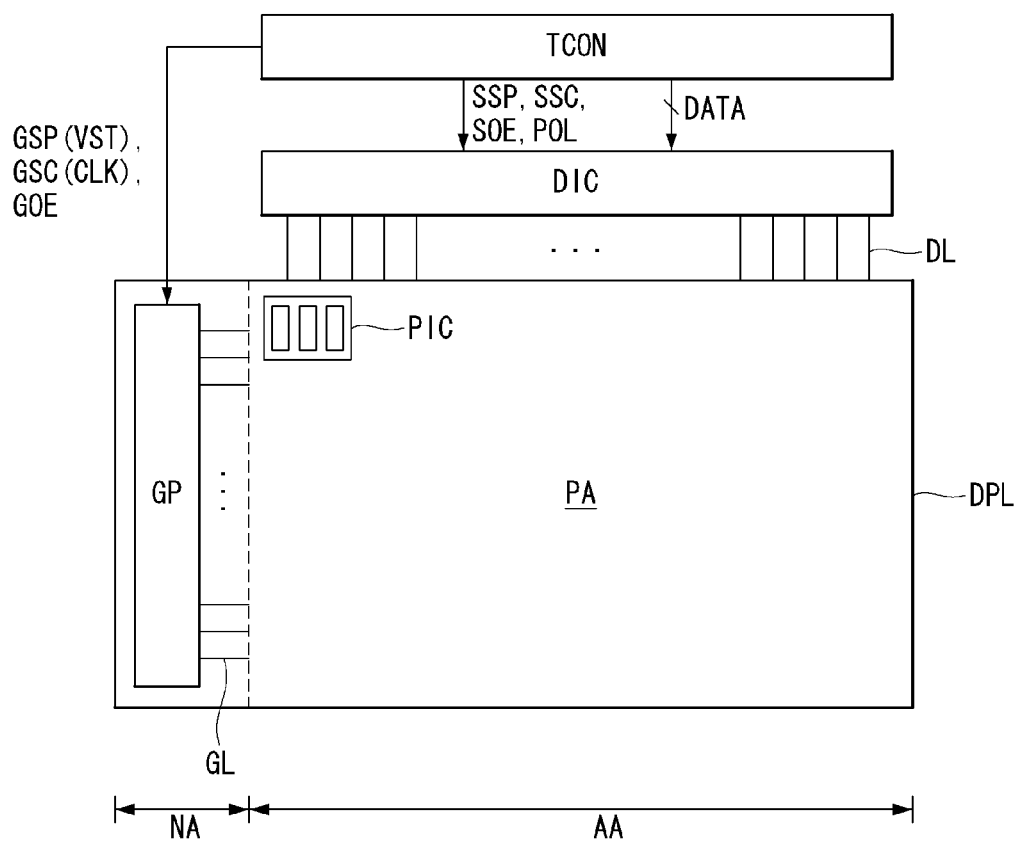
FIG. 5 is a schematic view illustrating the structure of the flat panel display formed by GIP method.
Figure 6:
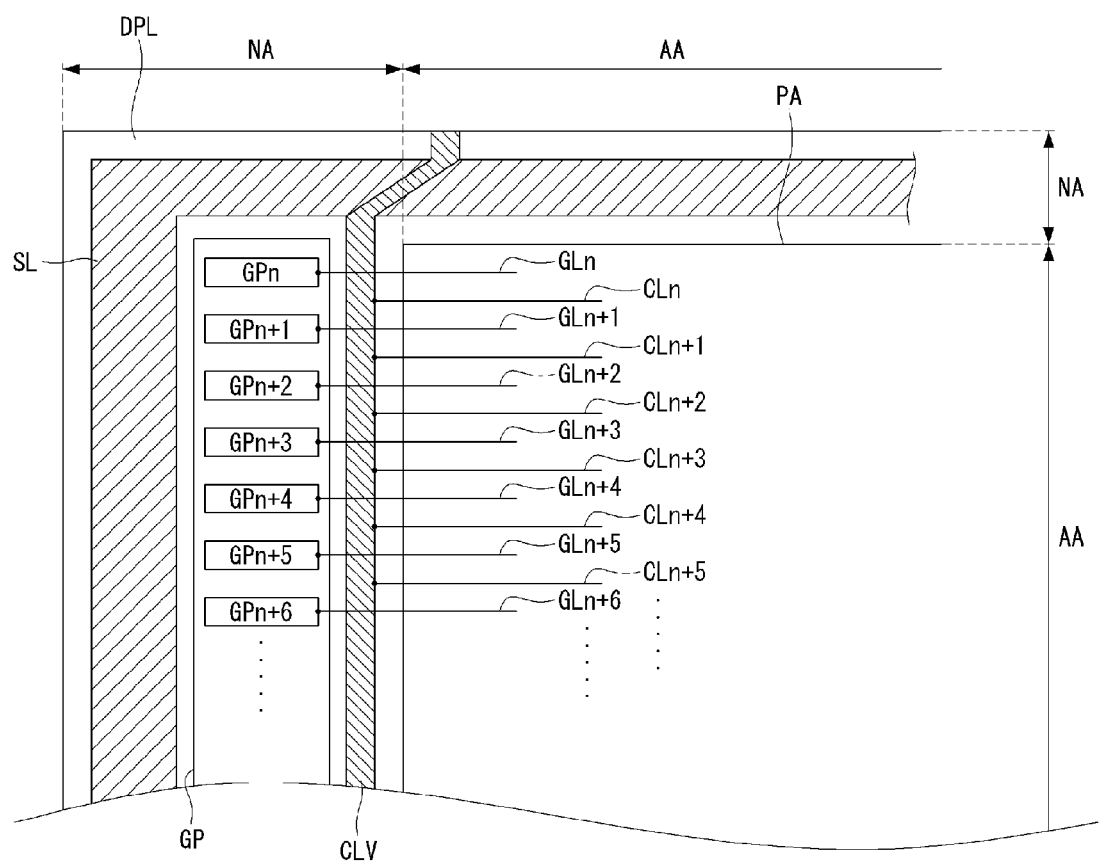
FIG. 6 is an enlarged plane view illustrating the bezel area according to the first embodiment of the present disclosure.

Referring to FIGS. 4 to 6, we will explain about embodiments of the present disclosure. FIG. 4 is a plane view illustrating the structure of a flat panel display formed by GIP method according to the present disclosure. Referring to FIG. 4, at the one side of the upper portion of the display panel DPL, a data driver DIC may be disposed and connected to the data lines using the TAB method. Otherwise, a gate driver GP is directly formed at the non-display area NA which is one outer side of the pixel area PA for representing the video data in the display panel DPL.

Comparing with the TAB method, in the GIP method, the bezel area of the display can be made in slim type so that the appearance may be improved and the cost for manufacturing can be reduced. Therefore, recently, the gate driver GP is formed by GIP method rather than TAB method. In drawings of the present disclosure, the gate driver GP by GIP method may occupy many portions of the display panel DPL. Or, it may have multiple components with similar area to that of the gate driver GIC shown with reference to FIG. 1 in the display panel DPL. However, this is caused in convenience for explaining. In actuality, with the GIP method, the area for the gate driver GP in the display panel GP is much smaller than the area for the gate driver according to the TAB method. For example, using the GIP method, the bezel area can be formed within a space of 15 mm width.

Hereinafter, referring to FIG. 5, we will explain about the flat panel display formed by GIP method in detail. FIG. 5 is a schematic view illustrating the structure of the flat panel display formed by GIP method. The flat panel display according to the GIP method may include a display panel DPL, a controller TCON, and a data driver DIC. The display panel DPL comprises a display area AA in which a pixel area PA is formed for representing the video data, and a non-display area NA in which a gate driver GP is formed directly.

Especially, the display area AA of the display panel DPL may have signal lines including a plurality of data lines DL and a plurality of gate lines GL crossing with the data lines DL, on a glass substrate. At the display area AA where the pixel area PA is defined by the crossing structure of the signal lines DL and GL, a plurality of pixels PIC are arrayed in a matrix manner. Each pixel PIC may include a red subpixel, a green subpixel, and a blue subpixel. At the non-display area NA, a gate driver GP may be formed for driving the gate lines GL of the display area AA.

The controller TCON supplies the RGB data of the video data received from the video source to the drivers DIC and GP. Further, the controller TCON generates the control signals for controlling the drivers DIC and GP using the timing signals including the vertical synchronizing signal (Vsync), the horizontal synchronizing signal (Hsync), the data enable signal (DE), the dot clock (DCLK) and so on.

The data control signal for controlling the operating timing of the data driver DIC comprises a source start pulse (SSP) indicating the starting point within the 1 horizontal period in which one horizontal line data is represented, a source sampling clock (SSC) controlling the latch operation of the data based on the rising or falling edge, a source output enable signal (SOE) controlling the output of the data driver DIC, and a polarity control signal (POL) controlling the polarity of the data voltage supplied to the display panel DPL.

The gate control signal for controlling the operating timing of the gate driver GP comprises a gate start pulse (GSP) indicating the start horizontal line at which the scanning is starting within the 1 vertical period of one video page, a gate shift clock (GSC) sequentially shifting the gate start pulse (GSP) by inputting into the shift register in the gate driver GP, and a gate output enable signal (GOE) controlling the output of the gate driver GP.

As for driving the data lines DL, the data driver DIC includes a shift register, a latch, a digital-analog converter (DAC), an output buffer and so on, which are not shown. The data driver DIC latches the video data according to the data control signals such as SSP, SSC, SOE and so on. Responding to the polarity control signal (POL), the data driver DIC reverses the polarity of the data voltage by converting the video data with the analog positive gamma compensating voltage or analog negative gamma compensating voltage. The data driver DIC outputs the data voltage to the data lines DL by synchronizing to the main scan pulse output from the gate driver GP.

The gate driver GP includes a shift register array and so on. The shift register array of the gate driver GP is formed by the GIP method, at the non-display area NA located at the outer portion of the display area AA having the pixels PIC in the display panel DPL. By the GIP method, the gate shift register may be formed with the thin film transistors of the pixels by the thin film transistor manufacturing process. The gate driver GP drives the gate lines GL according to the gate control signals. The gate driver GP supplies the scan pulse having the turn on level voltage to the gate lines sequentially.

Hereinafter, referring to FIG. 6 in addition, we will explain about the structure of the non-display area NA where the gate driver GP is disposed, according to the first embodiment of the present disclosure. FIG. 6 is an enlarged plane view illustrating the bezel area according to the first embodiment of the present disclosure.

Referring to FIG. 6, the gate driver GP comprises a plurality of the gate driving circuits GPn, GPn+1, GPn+2, and so on connecting to the gate lines GLn, GLn+1, Gn+2, and so on, respectively. In the space between the border of the display area AA (or the pixel area PA) and the gate driver GP, a vertical common line CLv can be disposed as running in vertical direction. The vertical common line CLv can be connected to the timing controller TCON and the power pixels PIC through the data driver DIC disposed at the upper portion of the display panel DPL. Further, branching from the vertical common line CLv, a plurality of common lines CLn, CLn+1, CLn+2, and so on may be disposed in parallel with the gate lines GLn, GLn+1, Gn+2, and so on, respectively.

A sealing material SL may be disposed surrounding the gate driver GP and the pixel area PA for securing and joining the upper substrate and the lower substrate of the display panel DPL. At the non-display area NA, the vertical common line CLv, the gate driver GP and the sealing material SL are disposed. The size of the non-display area NA can determine or define the bezel area of the display panel DPL.

According to the first embodiment of the present disclosure, even though there is little difference in the actual size of the display panel DPL, the vertical common line CLv may need the width of 1.5~2.0mm, the gate driver GP may need the width of 4.5~6.0mm, and the sealing material SL may need the width of 2 mm. That is, the minimum width of the non-display area NA defining the bezel area may correspond to the minimum width for disposing the vertical common line CLv, the gate driver GP, and the sealing material SL. Therefore, in the first embodiment of the present disclosure, considering the outermost marginal space of the display panel DPL, the bezel area may have width of 9.5~12.0 mm. So, the narrow bezel structure can be acquired.

Figure 7:
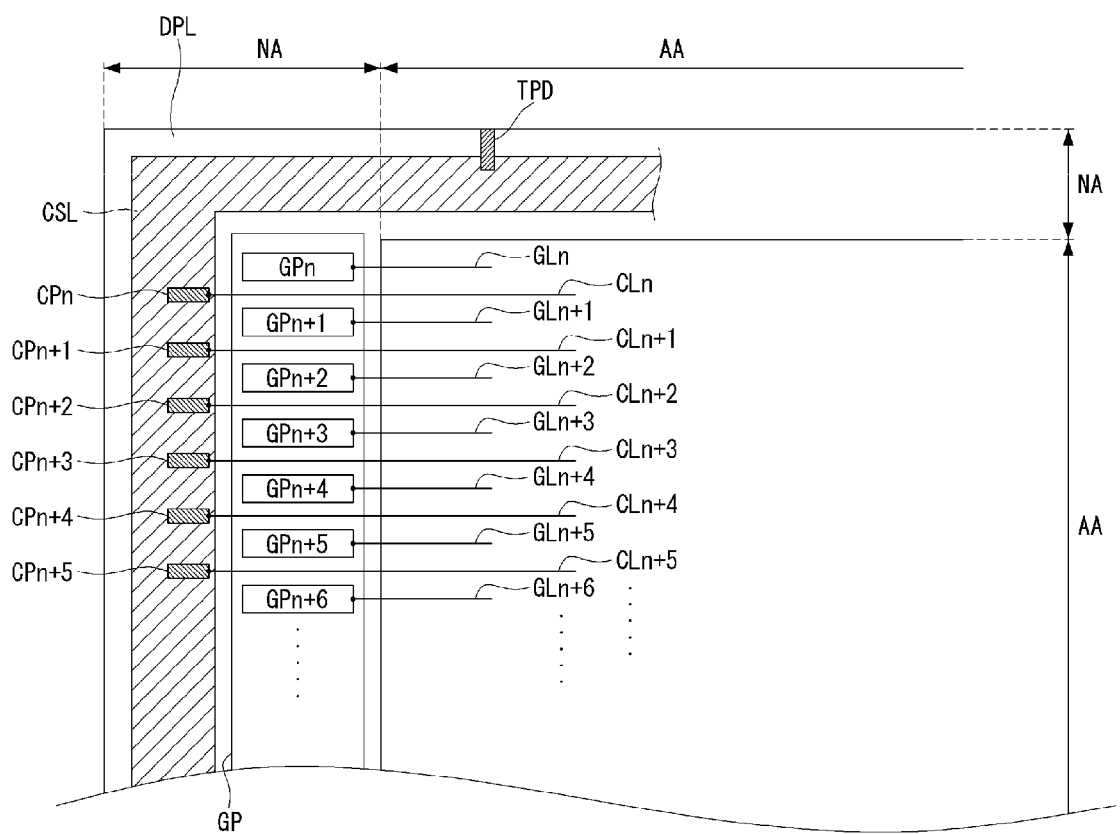
FIG. 7 is an enlarged plane view illustrating the bezel area according to the second embodiment of the present disclosure.

Hereinafter, referring to FIG. 7, we will explain about the structure of the non-display area NA having the gate driver GP according to the second embodiment of the present disclosure. FIG. 7 is an enlarged plane view illustrating the bezel area according to the second embodiment of the present disclosure.

Referring to FIG. 7, like the first embodiment of the present disclosure, the gate driver GP comprises a plurality of the gate driving circuits GPn, GPn+1, GPn+2, and so on connecting to the gate lines GLn, GLn+1, Gn+2, and so on, respectively. However, unlike the first embodiment, at the space between the display area AA and the gate driver GP, the vertical common line is not disposed.

In the second embodiment, instead of the vertical common line of the first embodiment, a conductive sealing material CSL is used. Within the conductive sealing area CSL a plurality of common pads CPn, CPn+1, CPn+2 and so on are formed as island shapes. Further, branching from the common pads CPn, CPn+1, CPn+2, and so on, a plurality of common lines CLn, CLn+1, CLn+2, and so on are disposed in parallel with the gate lines GLn, GLn+1, Gn+2, and so on, respectively. The conductive sealing material CSL secures and joins the upper substrate and the lower substrate of the display panel DPL and is disposed so as to surround the gate pad GP, the pixel area PA and the plurality of common pads CPn. Then, the conductive sealing material CSL can electrically connect the common pads CPn, CPn+1, CPn+2, and so on.

In addition, the conductive sealing material CSL can electrically connect to any one pad TPD of the data driver DIC disposed at upper side of the display panel DPL. Therefore, the common pads CPn, CPn+1, CPn+2, and so on can be connected to the timing controller TCON and the power PIC through the conductive sealing material CSL. As a result, the common signal and the common voltage from the timing controller TCON and the power PIC can be supplied to the common lines CLn, CLn+1, CLn+2, and so on through the conductive sealing material CSL and the common pads CPn, CPn+1, CPn+2, and so on.

In some embodiments the common pads CPn, CPn+1, CPn+2, and so on can be made of the same material as the gate lines GL and the common lines CLn, CLn+1, CLn+2, and so on. In this case, the common pads CPn, CPn+1, CPn+2, and so on may be covered by an insulating layer such as the gate insulating layer GI and the passivation layer PAS. By patterning the insulating layers, contact holes for exposing the common pads CPn, CPn+1, CPn+2, and so on may be formed. And then, common pad terminals contacting the common pads CPn, CPn+1, CPn+2, and so on, respectively, may be formed on the topmost layer. Then, as the common pad terminals electrically contact to the conductive sealing material CSL, all common pads CPn, CPn+1, CPn+2, and so on can be electrically connected to the conductive sealing material CSL. As this structure is similar to those of the gate pad GP and gate pad terminal GPT, further explanation on this embodiment is omitted for brevity.

Further, under the conductive sealing material CSL, a ground line may be disposed. The ground line may be formed as being not directly contacted to the common pads CPn, CPn+1, CPn+2, and so on. In that case, defining the pattern of the ground line, the common pads CPn, CPn+1, CPn+2, and so on may be formed as having an island shape isolated from the ground line.

The non-display area NA according to the second embodiment of the present disclosure includes the common pads CPn, CPn+1, CPn+2, and so on, the gate driver GP and the conductive sealing material CSL. The size of the non-display area NA can define the bezel area of the display panel DPL. In the second embodiment, the common pads CPn, CPn+1, CPn+2, and so on are disposed in the same area of the conductive sealing material CSL. Therefore, through the integration of the function of the vertical common line CLv into the sealing region SL using conductive sealant CSL and common pads CPn, the bezel area can be smaller and/or narrower than that of the first embodiment.

According to the second embodiment of the present disclosure, even though there are some differences in the actual size of the display panel DPL, the bezel area is determined by the width of 4.5~6 mm for the gate driver GP and the width of 2 mm for the conductive sealing material CSL. That is, the minimum width of the non-display area NA deciding the bezel area may correspond to the minimum width for disposing the gate driver GP and the conductive sealing material CSL. Therefore, according to the second embodiment, considering the outermost marginal space of the display panel DPL, the bezel area may have width of 6.5~10.0 mm. So, a very narrow bezel structure can be obtained.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A flat display panel, comprising:
   a substrate including a display area and a non-display area surrounding the display area, the display area comprising a plurality of common lines each coupled to a corresponding one of a plurality of rows of pixels;
   a gate in panel (GIP) gate driver formed in the non-display area of the substrate;
   a conductive sealing region formed in the non-display area, the conductive sealing region surrounding the gate driver, the conductive sealing region including conductive sealant supplying a common line voltage throughout an entirety of the conductive sealing region; and
   a plurality of common pads formed within the conductive sealing region and each coupled to a corresponding one of the common lines to apply the common line voltage to said corresponding one of the rows of pixels, the common line voltage supplied to the plurality of common pads through the conductive sealant surrounding each common pad, the conductive sealant electrically connecting the plurality of common pads directly to each other,
   wherein the plurality of common pads are disposed proximate to a first side of the gate driver, and the display area is disposed proximate to a second side of the gate driver opposite the first side.

2. The flat display panel according to claim 1, wherein the display area comprises a plurality of gate lines each coupled to said corresponding one of the rows of pixels, and wherein the gate driver formed in the non-display area between the display area and the conductive sealing region is configured to apply gate signals to the gate lines.

3. The flat display panel according to claim 1, wherein said gate lines are substantially parallel to said common lines within the display area.

4. The flat display panel according to claim 1, wherein the common pads and conductive sealant disposed in the conductive sealing region directly contact each other to make an electric connection.

5. The flat display panel according to claim 1, wherein the common pads are electrically connected to common pad terminals via contact holes formed in an insulating layer disposed to cover the common pads, the conductive sealant in contact with the common pad terminals to provide the direct electrical connection among the common pad terminals to each other.

6. The flat display panel according to claim 1, wherein the conductive sealant receives the common line voltage from a data driver disposed on an upper edge of the display panel, the conductive sealant electrically connecting the data driver to the plurality of common pads.

7. The flat display panel according to claim 1, wherein the gate driver comprises a plurality of gate driving circuits connected to a plurality of gate lines, and the plurality of gate lines each correspond to at least one of the common lines corresponding to one of the rows of pixels.

8. The flat display panel according to claim 1, wherein a width of the bezel is between 6.5 mm and 10 mm.

9. The flat display panel according to claim 8, wherein a width of the gate driver is between 4.5 mm and 6 mm and a width of the conductive sealing region is 2 mm.

10. A flat display panel, comprising:
    a substrate including a display area and a non-display area surrounding the display area, the display area comprising a plurality of common lines each coupled to a corresponding one of a plurality of rows of pixels;
    a gate in panel (GIP) gate driver formed in the non-display area of the substrate;
    a conductive sealing region formed in the non-display area, the conductive sealing region surrounding the gate driver, the conductive sealing region including conductive sealant supplying a common line voltage throughout an entirety of the conductive sealing region; and
    a plurality of common pads formed within the conductive sealing region and each coupled to a corresponding one of the common lines to apply the common line voltage to said corresponding one of the rows of pixels, the common line voltage supplied to the conductive sealant surrounding each common pad to electrically connect the plurality of common pads directly to each other through the conductive sealant,
    wherein a minimum width of the bezel corresponds to a minimum width of the gate driver added to a minimum width of the conductive sealing region formed within the non-display area, the minimum width of the bezel measured between an edge of the flat display panel and an edge separating the display area from the non-display area, and
    wherein the plurality of common pads are disposed proximate to a first side of the gate driver, and the display area is disposed proximate to a second side of the gate driver opposite the first side.

11. The flat display panel according to claim 10, wherein the display area comprises a plurality of gate lines each coupled to said corresponding one of the rows of pixels, and wherein the gate driver formed in the non-display area between the display area and the conductive sealing region is configured to apply gate signals to the gate lines.

12. The flat display panel according to claim 10, wherein said gate lines are substantially parallel to said common lines within the display area.

13. The flat display panel according to claim 10, wherein the common pads and conductive sealant disposed in the conductive sealing region directly contact each other to make an electric connection.

14. The flat display panel according to claim 10, wherein the common pads are electrically connected to common pad terminals via contact holes formed in an insulating layer disposed to cover the common pads, the conductive sealant in contact with the common pad terminals to provide the direct electrical connection among the common pad terminals to each other.

15. The flat display panel according to claim 10, wherein the conductive sealant receives the common line voltage from a data driver disposed on an upper edge of the display panel, the conductive sealant electrically connecting the data driver to the plurality of common pads.

16. The flat display panel according to claim 10, wherein the gate driver comprises a plurality of gate driving circuits connected to a plurality of gate lines, and the plurality of gate lines each correspond to at least one of the common lines corresponding to one of the rows of pixels.

17. The flat display panel according to claim 10, wherein a width of the bezel is between 6.5 mm and 10 mm.

18. The flat display panel according to claim 17, wherein a width of the gate driver is between 4.5 mm and 6 mm and a width of the conductive sealing region is 2 mm.

19. The flat display panel according to claim 1, wherein the conductive sealant electrically connects the plurality of common pads directly to each other without any common line electrically connecting the plurality of common pads to each other within the conductive sealing region.

20. The flat display panel according to claim 10, wherein the conductive sealant electrically connects the plurality of common pads directly to each other without any common line electrically connecting the plurality of common pads to each other within the conductive sealing region.

* * * * *